United States Patent [19]

Ozaki et al.

[11] Patent Number: 5,070,147
[45] Date of Patent: Dec. 3, 1991

[54] GRAFT COPOLYMERS EFFECTIVE AS ADDITIVES TO UNSATURATED POLYESTER RESINS

[76] Inventors: Tatsuhiko Ozaki, 6-74 Eiraku-cho, Nishio, Aichi; Hirotaka Wada, 2-5, Minato-machi, Gamagori, Aichi; Fumitoshi Sugiura, 26-5 Sakuma, Takenoya-cho, Gamagori, Aichi, all of Japan

[21] Appl. No.: 400,479

[22] Filed: Aug. 30, 1989

[30] Foreign Application Priority Data

Sep. 17, 1988 [JP] Japan .................................. 63-233262

[51] Int. Cl.$^5$ ...................... C08G 63/08; C08F 283/14
[52] U.S. Cl. ..................................... 525/285; 525/301; 525/63; 526/266; 526/317.1; 526/318
[58] Field of Search ................ 525/285, 301; 526/266, 526/317.1, 318

[56] References Cited

U.S. PATENT DOCUMENTS 3,760,034 9/1973 Critchfield et al. ................. 525/412
4,670,485 7/1987 Hesse et al. ........................ 525/64 X

*Primary Examiner*—John C. Bleutge
*Assistant Examiner*—Vasu S. Jagannathan

[57] ABSTRACT

A graft copolymer, which is effective as an additive to unsaturated polyester resins, contains 10–80 weight % of a macromonomer of a specified kind, 20–89.9 weight % of a vinyl monomer of another specified kind, and 0.1–5 weight % of vinyl monomers of still other kinds. If necessary, up to 40 weight % of still another constituent of a specified kind may be contained.

12 Claims, No Drawings

GRAFT COPOLYMERS EFFECTIVE AS ADDITIVES TO UNSATURATED POLYESTER RESINS

BACKGROUND OF THE INVENTION

This invention relates to graft copolymers which are effective as additives to unsaturated polyester resins.

Fiber reinforced plastics (or FRP) using unsaturated polyester resins have superior qualities not only regarding strength and resistance against heat, water and chemicals but also regarding productivity and are widely utilized for the production of bathtubs, panels for water tanks, bathroom sinks and exterior body of automobiles. This invention relates to graft copolymers which are effective as additives to such unsaturated polyester resins and in particular to such graft copolymers of a prescribed structure having a polycaprolactone chain closed by an inactive end group in its branch.

It is known that thermosetting unsaturated polyester resins shrink significantly when they are cured and hence that molded products from these resins tend to crack or warp. Thus, glass fibers which are used for the purpose of reinforcement may become visible and pin holes may be generated. The surface appearance and paintability are thereby adversely affected and there is the additional problem of rendering the dimensional stability inferior.

Prior art methods of overcoming such problems included mixing a thermoplastic resin such as polystyrene, polyvinyl acetate, polymethyl methacrylate and block copolymer of conjugate diene compound and aromatic vinyl compound to an unsaturated polyester resin as a low profile additive (29th National SAMPLE Symposium, Apr. 3-5, 1984). Among thermo-plastic resins, however, there has been none which is totally satisfactory from all points of view including compatibility and dispersibility when mixed with an unsaturated polyester resin, ability to reduce shrinkage, surface appearance and paintability of molded products. At the present time, therefore, choices are being made only to take advantage of no more than one of the desirable characteristics.

In order to improve the situation described above, polystyrene-polyester graft copolymers having a polyester chain in the branch have been considered recently (Japanese Patent Publication Tokkai 60-99158). As methods of obtaining a polyester chain in the branch, poly-condensation of dibasic acid and glycol, ring-opening polymerization of polycaprolactone and ring-opening polymerization of acid anhydride and alkylene oxide have been disclosed. The two end groups of such polyester chains are always a hydroxyl group or a carboxylic group and macromonomers are obtained by introducing a vinyl group into one of these end groups through a reaction with various reaction reagent. Graft copolymers are obtained through copolymerization of such macromonomers with other vinyl monomers.

A prior art method of this kind has the following problems. Firstly, since use is made of a macromonomer having a hydroxyl group and a carboxylic group as its end groups, gel substances of unknown structure are easily produced and it is therefore difficult to produce a graft copolymer of a prescribed structure.

Moreover, if macromonomers are produced by the disclosed method, in particular, bifunctional macromonomers having vinyl groups introduced at both ends are inevitably produced as by-products and, since it is extremely difficult to remove these bifunctional macromonomers by purification, these bifunctional monomers eventually participate in the copolymerization reaction, producing a significant amount of three-dimensional gel substances.

Graft copolymers obtained by copolymerization of ethylenic unsaturated monomer onto the principal chain of polycaprolactone (U.S. Pat. No. 3,760,034) and graft copolymers obtained by copolymerization of polyaduct (such as polyamide and polyether) or polycondensate (such as polyester) onto the principal chain of polydiene-type elastomer (U.S. Pat. No. 4,670,485) have also been considered. According to these references, graft copolymers are obtained by reacting an ethylenic unsaturated monomer or a macromonomer with a polymer on the principal chain of polycaprolactone or polydiene-type elastomer in the presence of an initiator agent for radical polymerization. By these prior art methods, however, the degree of grafting of ethylenic unsaturated monomers and macromonomers are poor and a large amount of homopolymers comes to be mixed with the product. Thus, it becomes difficult to separate the desired graft copolymer from the reaction product. Moreover, it is difficult to control the degree of grafting and the graft chain length, and there also arises the problem that generation of three-dimensional gel materials cannot be avoided.

As an additive to unsaturated polyester resins, furthermore, graft copolymers obtained by these prior art methods have serious problems in that they cannot at all provide the high levels of capability to reduce shrinkage, surface smoothness and paintability required, for example, on external panels of automobiles.

SUMMARY OF THE INVENTION

It is therefore an object of the present invention to provide new graft copolymers with which the current problems described above can be eliminated.

The present invention has been achieved by the present inventors as a result of their diligent work in view of the above to obtain a new graft copolymer which would provide superior compatibility and dispersibility with unsaturated polyester resins and olefinic unsaturated monomers, superior ability to reduce shrinkage, surface smoothness and paintability of molded products. The present invention is based on the present inventors' discovery that graft copolymers of a prescribed structure having in the branch a polycaprolactone chain closed with inactive end groups satisfy the desired conditions

DETAILED DESCRIPTION OF THE INVENTION

This invention relates to graft copolymers which are effective as additives to unsaturated polyester resins, each comprising (1) 10-80 weight % of a first constituent given by

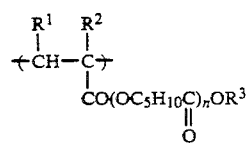

(2) 20-89.9 weight % of a second constituent given by

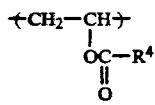

(3) 0.1-5 weight % of a third constituent which is a vinyl monomer unit having a carboxylic group or an acid anhydride group, and (4) 0-40 weight % of a fourth constituent which is vinyl monomer unit selected from vinyl chloride unit, styrene unit, alkyl vinyl ether unit with 1-6 carbon atoms, phenyl vinyl ether unit and vinyl benzoate unit, where $R^1$ is $CH_3$; $R^2$ is H; $R^3$ is —$C_mH_{2m}O)_rR^6$, $R^6$ being a hydrocarbon group with 1-18 carbon atoms, m being 2-3, and r being 1-5; $R^4$ is an alkyl group with 1-3 carbon atoms; and n is 5-90. The first constituent is an ester macromonomer unit of crotonic acid, acrylic acid or methacrylic acid and the second constituent is a vinyl carboxylate monomer unit such as vinyl acetate unit, vinyl propionate unit, vinyl lactate unit and vinyl isolactate unit. They may be used either singly or as a combination of two or more kinds but vinyl acetate unit is particularly preferable.

The macromonomers as the material for the aforementioned first constituent can be obtained by a ring-opening addition reaction of ε-caprolactone with monohydroxyl compound such as aliphatic alcohol, alicyclic alcohol, polyalkylene glycol monoalkyl ether, polyalkylene glycol monoaryl ether or polyalkylene glycol monoalkylaryl ether, followed by an esterification or ester exchange reaction using crotonic acid, acrylic acid, methacrylic acid or an ester-forming derivative thereof. Examples of such macromonomers include Macromonomer M-1 given by

Macromonomer M-3 given by

and Macromonomer M-5 given by

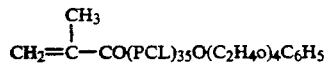

where PCL is given by

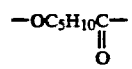

Examples of vinyl monomers as the material for the aforementioned third constituent include crotonic acid, acrylic acid, methacrylic acid, maleic anhydride, maleic acid, itaconic anhydride, itaconic acid and also monoesters of maleic acid such as monomethyl maleate, monoethyl maleate, monobutyl maleate, mono-2-ethylhexyl maleate, monohydroxyethyl maleate and mono-2-hydroxypropyl maleate. Of the above, however, crotonic acid and maleic anhydride are advantageous from industrial points of view. The third constituent may be introduced into a graft copolymer through copolymerization of such a vinyl monomer described above. Alternatively, such an introduction may be effected through copolymerization of maleic anhydride, followed by a reaction with a compound having a hydroxyl group such as methanol or ethanol.

The graft copolymers of the present invention may contain up to 40 weight % of the fourth constituent. Examples of vinyl monomers as the materials for the aforementioned fourth constituent include vinyl monomers having neither a hydroxyl group nor a carboxylic group such as vinyl chloride, styrene, α-methyl styrene, methyl vinyl ether, phenyl vinyl ether and vinyl benzoate.

As mentioned above, the ratio at which the constituents of the graft copolymers of the present invention may be contained is within the range given in units of weight % by First / Second / Third Fourth = 10-80/ 20-89.9/ 0.1-5/ 0-40. It is preferable, however, that the ratio be within the range given by 10-70 / 30-89.8 / 0.2-2.0 / 0. If the ratio is not within the range given above, the advantageous effects of the graft copolymers of the present invention cannot be fully attained.

A graft copolymer of the present invention can be synthesized by using a macromonomer as a material for the first constituent, a vinyl monomer serving as a material for the second constituent, a vinyl monomer serving as a material for the third constituent and, if necessary, another vinyl monomer serving as a material for the fourth constituent. Known methods may be used for the synthesis such as solution polymerization, emulsion polymerization and suspension polymerization. From the point of the view of the purpose to be served, the molecular weight of the aforementioned macromonomer should be in the range of 800-10000 and more preferably in the range of 1000-8000. Moreover, it is preferred that the molecular weight of the synthesized graft copolymer of the present invention be 10000 or greater and, in particular, in the range of 20,000-200,000.

The graft copolymers of the present invention are extremely effective as an additive to unsaturated polyester resins. Superior compatibility and dispersibility can be obtained, for example, if a graft copolymer of the present invention is added to and mixed with an unsaturated polyester resin composition composed of an unsaturated polyester resin, a vinyl polymerizing monomer, a filler, reinforcing fibers and additives of other kinds at a rate of 5-50 weight parts (against 100 weight parts of the unsaturated polyester resin) and, in particular, at a rate of 10-35 weight parts. Moreover, significant reduction in shrinkage at the time of hardening of the product as well as superior surface smoothness and paintability can be attained if such a mixed resin composition is used in a molding process of all types such as by compression, plutrusion and injection.

In what follows, examples of the present invention are presented in order to more clearly describe the present invention as well as its effects but it goes without saying that these examples are not intended to limit the scope of the present invention.

Examples

Graft copolymers were synthesized as described below. Their results are summarized in Table 1.

Synthesis of Macromonomer M-1

Placed inside a flask were 50 g of ethyl cellosolve and 1 g of tetrabutyl titanate and it was heated to 150° C. after its interior was replaced with nitrogen. After 2200 g of ε-caprolactone was dropped over a period of one hour, a reaction was continued for 2 hours at 150° C. to obtain a caprolactone adduct of hydroxyl value of 14.0.

Next, 250 g of the caprolactone adduct thus obtained, 8.0 g of crotonic acid, 250 g of toluene, 0.5 g of sulfuric acid and 0.01 g of hydroquinone were placed inside a flask for an esterification reaction over a period of 8 hours with heating in reflux. After the content was cooled down to 60° C., the sulfuric acid was neutralized with sodium hydrogencarbonate and the salt thus obtained by neutralization was dissolved by adding water. The water layer and the toluene layer were separated and Macromonomer M-1 (acid value=0.6, hydroxyl value=1.9, and molecular weight=about 4100) was obtained by removing water and solvent from the toluene layer under a reduced pressure. Hereinafter, molecular weights are polystyrene equivalent values obtained by the GPC method.

Aforementioned Macromonomers M-3 as well as Macromonomer R given as

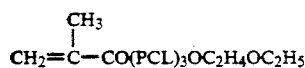

were also obtained similarly.

Synthesis of Graft Copolymer G-1

Placed inside a flask were 20 g of aforementioned Macromonomer M-1, 79 g of vinyl acetate, 1 g of crotonic acid and 25 g of methanol and it was heated after its interior was replaced with nitrogen. When the interior temperature reached 62° C., 10 ml of 5% methanol solution of azobisisobutyronitrile was gradually added for a reaction over a period of 5 hours. Next, the reaction solution was cooled to the room temperature and poured into 500 ml of isopropanol to cause the copolymer to precipitate. After the deposited white precipitate was washed three times with 100 ml of isopropanol, it was dried in vacuum at 70° C. to synthesize Graft Copolymer G-1 of molecular weight about 140,000 containing 73 weight % of vinyl acetate unit and 1 weight % of crotonic acid unit.

Graft Copolymers G-2 to G-8 were also synthesized similarly. For the purpose of comparison, Graft Copolymers R-1 to R-6 not embodying the present invention were additionally synthesized. Graft Copolymers R-7, R-8 and R-9 were synthesized as follows:

Synthesis of Graft Copolymer R-7

Polystyrene-polyester graft copolymer was synthesized (as Graft Copolymer R-7) through copolymerization of 50 weight % of macromonomers of molecular weight 3200 having a polypropylene phthalate chain according to the method of Japanese Patent Publication Tokkai 60-99158. The graft copolymer (R-7) thus obtained was dissolved in toluene but its molecular weight was not measured because an undissolved portion was observed.

Synthesis of Graft Copolymer R-8

Placed inside an autoclave were 200 g of polycaprolactone with molecular weight of 10,000, 50 g of vinyl acetate and 2 g of dicumyl peroxide for a reaction at 145° C. over a period of 3 hours according to a method described in U.S. Pat. No. 3,760,034 to synthesize a graft polymer (R-8) having polycaprolactone as its principal chain and polyvinyl acetate as its branch. The graft copolymer (R-8) thus obtained was dissolved in toluene but its molecular weight was not measured because an undissolved portion was observed.

Synthesis of Graft Copolymer R-9

Placed inside a flask were 25 g of hydroxyethyl crotonate, 1 g of tetrabutyl titanate and 0.2 g of hydroquinone and it was heated to 150° C. after its interior was replaced with nitrogen. After 750 g of $\epsilon$-caprolactone was dropped over a period of one hour, a reaction was continued at 150° C. for 2 hours to obtain a macromonomer with hydroxyl value of 15.2 and molecular weight of about 3700. Thereafter, 30 g of methanol was used as solvent for a reaction as described above in connection with the synthesis of Graft Copolymer G-1 with 40 g of the aforementioned macromonomer, 59 g of vinyl acetate and 1 g of crotonic acid. Generation of a gel material was observed at the end of the reaction. The reaction product was cooled down to the room temperature and poured into 500 ml of isopropanol to cause the copolymer to precipitate. After the deposited white precipitate was washed three times with 150 ml of isopropanol, it was dried in vacuum at 70° C. to synthesize Graft Copolymer R-9. Graft Copolymer R-9 swells with toluene but its molecular weight could not be measured because it did not dissolve.

TABLE 1

| | Materials Constituents | | | | | Graft Copolymer | |
|---|---|---|---|---|---|---|---|
| | I | II | III | IV | wt ratio | wt ratio | Molecular weight $\times 10^4$ |
| Test Samples | | | | | | | |
| G-1 | M-1 | *1 | *4 | — | 20/79/1/0 | 26/73/1/0 | 14.0 |
| G-2 | M-1 | *1 | *4 | — | 40/59/1/0 | 47/52/1/0 | 11.9 |
| G-3 | M-1 | *1 | *4 | — | 60/39/1/0 | 62/37/1/0 | 7.7 |
| G-4 | M-1 | *2 | *4 | — | 40/59/1/0 | 45/54/1/0 | 7.4 |
| G-5 | M-3 | *1 | *5 | — | 40/59/1/0 | 43/56/1/0 | 11.2 |
| G-6 | M-3 | *1 | *5 | — | 40/58/2/0 | 42/56/2/0 | 13.1 |
| G-8 | M-1 | *1 | *4 | *6 | 40/39/1/20 | 41/38/1/20 | 6.1 |
| Comparison | | | | | | | |
| R-1 | — | *1 | *4 | — | 0/99/1/0 | 0/99/1/0 | 12.8 |
| R-2 | M-1 | *1 | *4 | — | 85/14/1/0 | 84/15/1/0 | 2.9 |
| R-3 | M-1 | *1 | *4 | — | 40/60/0/0 | 46/54/0/0 | 9.7 |
| R-4 | M-1 | *1 | *5 | — | 40/50/10/0 | 45/45/10/0 | 11.2 |
| R-5 | M-1 | *3 | *4 | — | 40/59/1/0 | 41/58/1/0 | 6.6 |

TABLE 1-continued

| | Materials | | | | | Graft Copolymer | |
|---|---|---|---|---|---|---|---|
| | Constituents | | | | | | Molecular weight |
| | I | II | III | IV | wt ratio | wt ratio | × 10⁴ |
| R-6 | R | *1 | *4 | — | 40/59/1/0 | 45/54/1/0 | 10.4 |

Notes:
*1: Vinyl acetate
*2: Vinyl butylate
*3: Vinyl 2-ethylhexanoate
*4: Crotonic acid
*5: Maleic anhydride
*6: Vinyl benzoate In Table 1, "Constituents" and "Other" indicate the monomers from which the corresponding graft copolymer is formed. For Constituent I (first), therefore, they indicate macromonomers. The weight ratios regarding source materials are those among materials for the first, second, third and fourth constituents and the weight ratios regarding graft copolymers are those among the first, second, third and fourth constituents.

Tests

Each of the graft copolymers embodying the present invention (Graft Copolymers G-1 to G-8) and the graft copolymers for the purpose of comparison not embodying the present invention (Graft Copolymers R-1 to R-6) was dissolved in styrene to obtain 33-weight % styrene solutions. Sheet molding compounds (SMC) were prepared from them as shown in Table 2. Since Graft Copolymers R-7 to R-9 and SBS are insoluble in styrene, however, the samples were pulverized and suspended in styrene to prepare 33-weight % styrene suspensions.

TABLE 2

| Component Component | Weight part |
|---|---|
| 33-wt % styrene solution or suspension of graft copolymer | 40 |
| Unsaturated polyester resin (*7) | 60 |
| Tertiary butyl perbenzoate | 1.5 |
| Zinc stearate | 3 |
| Calcium carbonate powder | 180 |
| Magnesium oxide | 1 |
| Glass fibers of ½ inch in length | 56 |

(*7) Yupika7507 TM produced by Nippon Yupika, Inc.

Plates of dimensions 200 mm×200 mm×2 mm were obtained from these SMCs by press molding at pressure of 100 kg/cm², mold temperature of 140° C. and molding time of 3 minutes. These plates were evaluated as follows to compare the effects of the graft copolymers as additives to unsaturated polyester resins. The results are shown in Table 3.

(1) Linear shrinkage ratio

After each molded plate was left for 24 hours at 23° C. and 50% RH, a micrometer was used to measure its length and to obtain its difference from the size of the mold. The ratio between this difference and the measured length is listed. Minus signs indicate expansion.

(2) Surface smoothness

A checkerboard design was reflected from each plate and distortions of the lines were observed visually. Surface smoothness was evaluated as follows:

| A (Good) | No distortions visible |
|---|---|
| B (OK) | Some distortions are visible |
| C (Not good) | Big distortions are visible |

(3) Surface scum

The surface scum of each plate caused by the appearance of added graft copolymer was visually observed.

(4) Stain on mold

As the plate was removed from the mold, the presence or absence of stain on the mold was visually determined.

(5) Paintability

A two-liquid acryl urethane primer was applied to the plate surfaces. After it was hardened at 120° C. for 30 minutes, its adhesion characteristic was examined by crosshatch tests and the results were evaluated as follows:

| A (Good) | 100/100 |
|---|---|
| B (OK) | 95/100–99/100 |
| C (Not good) | 94/100 or below |

Table 3 clearly shows that the graft copolymers embodying the present invention provide superior compatibility and dispersibility with unsaturated polyester resins and that products with reduced shrinkage, superior surface appearance and paintability can be obtained.

TABLE 3

| | Graft Copolymer | Linear Shrinkage | Surface Smoothness | Surface Scum | Mold Stain | Paintability |
|---|---|---|---|---|---|---|
| Test Samples | | | | | | |
| 1 | G-1 | 0.000 | A | absent | absent | A |
| 2 | G-2 | −0.009 | A | absent | absent | A |
| 3 | G-3 | −0.003 | A | absent | absent | A |
| 4 | G-4 | 0.002 | A | absent | absent | A |
| 5 | G-5 | −0.005 | A | absent | absent | A |
| 6 | G-6 | 0.006 | A | absent | absent | A |
| 8 | G-8 | 0.010 | A | absent | absent | A |
| Comparison | | | | | | |
| 1 | R-1 | 0.016 | B | present | absent | A |

TABLE 3-continued

| | Graft Copolymer | Results | | | | |
|---|---|---|---|---|---|---|
| | | Linear Shrinkage | Surface Smoothness | Surface Scum | Mold Stain | Paintability |
| 2 | R-2 | 0.011 | B | present | present | B |
| 3 | R-3 | 0.003 | B | present | present | C |
| 4 | R-4 | 0.024 | C | absent | absent | A |
| 5 | R-5 | 0.006 | C | present | present | C |
| 6 | R-6 | 0.011 | B | present | absent | B |
| 7 | R-7 | 0.095 | B | absent | absent | B |
| 8 | R-8 | 0.042 | C | absent | absent | B |
| 9 | R-9 | 0.036 | C | present | absent | C |
| 10 | SBS | 0.003 | A | present | present | C |

Note:
SBS: Hydrated styrene-butadiene-styrene block copolymer (Kraton GX-1855 produced by Shell Chemical, Inc.)

What is claimed is:

1. A graft copolymer effective as an additive to unsaturated polyester resins, said graft copolymer comprising 10-80 weight % of repeating units of a first macromonomer constituent given by

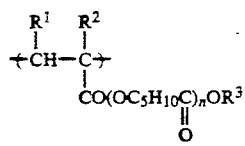

20-89.9 weight % of repeating units of a second monomer constituent given by

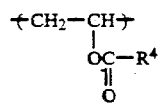

0.1-5 weight % of a third constituent which is a vinyl monomer unit having a carboxylic group or an acid anhydride group, and 0-40 weight % of a fourth constituent which is vinyl monomer unit selected from vinyl chloride unit, styrene unit, alkyl vinyl ether unit with 1-6 carbon atoms, phenyl vinyl ether unit and vinyl benzoate unit, where $R^1$ is $CH_3$; $R^2$ is H; $R^3$ is $-C_mH_{2m}O)_1R^6$, $R^6$ being a hydrocarbon group with 1-18 carbon atoms, m being 2-3, and r being 1-5; $R^4$ is an alkyl group with 1-3 carbon atoms; and n is 5-90.

2. The graft copolymer of claim 1 wherein said second constituent is given by

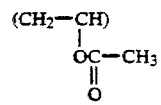

3. The graft copolymer of claim 2 comprising said first constituent by 10-70 weight %, said second constituent by 30-89.8 weight % and said third constituent by 0.2-2 weight % such that the total content of said first, second and third constituents is 100 weight %.

4. The graft copolymer of claim 2 wherein said third constituent is given by

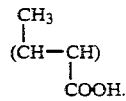

5. The graft copolymer of claim 2 wherein said third constituent is given by

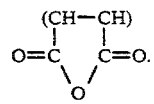

6. The graft copolymer of claim 4 comprising said first constituent by 10-70 weight %, said second constituent by 30-89.9 weight % and said third constituent by 0.2-2 weight % such that the total content of said first, second and third constituents is 100 weight %.

7. The graft copolymer of claim 5 comprising said first constituent by 10-70 weight %, said second constituent by 30-89.8 weight % and said third constituent by 0.2-2 weight % such that the total content of said first, second and third constituents is 100 weight %.

8. The graft copolymer of claim 1 comprising said first constituent by 10-70 weight %, said second constituent by 30-89.8 weight % and said third constituent by 0.2-2 weight % such that the total content of said first, second and third constituents is 100 weight %.

9. The graft copolymer of claim 1 wherein said third constituent is given by

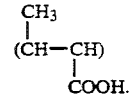

10. The graft copolymer of claim 9 comprising said first constituent by 10-70 weight %, said second constituent by 30-89.8 weight % and said third constituent by 0.2-2 weight % such that the total content of said first, second and third constituents is 100 weight %.

11. The graft copolymer of claim 1 wherein said third constituent is given by

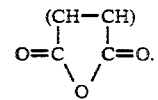

12. The graft copolymer of claim 11 comprising said first constituent by 10-70 weight %, said second constituent by 30-89.8 weight % and said third constituent by 0.2-2 weight % such that the total content of said first, second and third constituents is 100 weight %.

* * * * *